United States Patent
Zhang et al.

(10) Patent No.: US 9,650,500 B2
(45) Date of Patent: May 16, 2017

(54) NANOPOROUS PARTICLES IN A HOLLOW LATEX MATRIX

(75) Inventors: Yahong Zhang, Shanghai (CN); Stéphane Costeux, Midland, MI (US); Thomas H. Kalantar, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 774 days.

(21) Appl. No.: 13/879,522

(22) PCT Filed: Nov. 15, 2010

(86) PCT No.: PCT/CN2010/078729
§ 371 (c)(1),
(2), (4) Date: Apr. 15, 2013

(87) PCT Pub. No.: WO2012/065288
PCT Pub. Date: May 24, 2012

(65) Prior Publication Data
US 2013/0224464 A1    Aug. 29, 2013

(51) Int. Cl.
| | | |
|---|---|---|
| C08K 7/26 | (2006.01) | |
| C08K 7/22 | (2006.01) | |
| C08J 9/32 | (2006.01) | |
| C08J 3/12 | (2006.01) | |

(52) U.S. Cl.
CPC ............ *C08K 7/26* (2013.01); *C08J 3/126* (2013.01); *C08J 9/32* (2013.01); *C08K 7/22* (2013.01); *C08J 2325/06* (2013.01); *C08J 2433/00* (2013.01); *Y10T 428/249921* (2015.04); *Y10T 428/249972* (2015.04); *Y10T 428/268* (2015.01)

(58) Field of Classification Search
CPC .......... C08K 7/22; C08K 7/26; C08J 2325/06; C08J 2433/00; C08J 3/126; C08J 9/32; Y10T 428/249921; Y10T 428/249972; Y10T 428/268
USPC ................................................ 428/212, 220
See application file for complete search history.

(56) References Cited

U.S. PATENT DOCUMENTS

| | | | |
|---|---|---|---|
| 5,137,927 A | | 8/1992 | Wolff et al. |
| 5,461,125 A | * | 10/1995 | Lu .......................... C08F 265/04 523/201 |
| 5,656,195 A | | 8/1997 | Mielke et al. |
| 8,445,559 B2 | | 5/2013 | Bardman |
| 2003/0003284 A1 | | 1/2003 | Schwertfeger et al. |
| 2004/0077738 A1 | | 4/2004 | Field et al. |
| 2008/0284950 A1 | * | 11/2008 | Itoh .......................... C09D 5/24 349/96 |
| 2008/0287561 A1 | | 11/2008 | Menashi et al. |
| 2010/0010118 A1 | * | 1/2010 | Bardman ............... C08F 257/02 523/201 |
| 2010/0080949 A1 | | 4/2010 | Ou et al. |

FOREIGN PATENT DOCUMENTS

| | | |
|---|---|---|
| CN | 1668372 A | 9/2005 |
| CN | 101346420 A | 1/2009 |
| CN | 101585954 A | 11/2009 |
| CN | 101624429 A | 1/2010 |
| EP | 2143742 A1 | 1/2010 |
| WO | 03064025 A1 | 8/2003 |
| WO | 2007146945 A2 | 12/2007 |

OTHER PUBLICATIONS

K.S.W. Sing et al., Pure & Appl. Chem., vol. 57, No. 4, pp. 603-619 (1985).

* cited by examiner

*Primary Examiner* — Aaron Austin
*Assistant Examiner* — Lawrence Ferguson
(74) *Attorney, Agent, or Firm* — Steven W. Mork

(57) ABSTRACT

Prepare an article of manufacture by providing a latex of hollow latex particles with a rigid inner shell and adhesive outer shell, providing nanoporous particles and dispersing them into the latex and drying the latex so as to cause the hollow latex particle to bind to one another and form an article of manufacture containing nanoporous particles and hollow latex particles wherein the hollow latex particles are bound directly to one another to form a continuous matrix and the nanoporous particles are dispersed within the continuous matrix of hollow latex particles.

18 Claims, No Drawings

NANOPOROUS PARTICLES IN A HOLLOW LATEX MATRIX

BACKGROUND OF THE INVENTION

Field of the Invention

The present invention relates to an article of manufacture with nanoporous particles entrapped within a hollow latex particle matrix, a process for manufacturing such an article and a method for using such an article.

Description of Related Art

Energy efficient building structures are of ever increasing importance and are even becoming a subject of government requirements. Therefore, the building industry is in ever increasing need to identify thermally insulating materials that offer improved thermal insulating properties and that are suitable for use in a building construction environment and use.

Lightweight nanoporous materials are highly thermally insulating. For example, aerogel materials demonstrate thermal insulating properties superior to most building and construction insulation materials. However, nanoporous materials including aerogel materials are currently not practical for use in building and construction applications for a variety of reasons. For example, it is difficult to prepare nanoporous materials in a structure of sufficient size to use in insulating structural buildings. It is also difficult to prepare nanoporous insulation having sufficient mechanical integrity to hold up to a rugged construction environment. Various research efforts attempt to incorporate the benefits of nanoporous materials into a thermally insulating article that is suitable for use in building construction applications.

United States published patent application 2008/0287561, U.S. Pat. No. 5,137,927 and PCT publication WO2007/146945 disclose polymeric foam containing aerogel materials.

United States published patent application 2010/0080949 discloses compositions comprising organic-inorganic hybrid aerogel particles with a polymeric or oligomeric binder that covalently binds to the aerogel particles.

PCT publication WO 03/064025 discloses an aerogel composite comprising a base layer of hydrophobic aerogel particles in an aqueous binder.

United States published patent application 2004/0077738 discloses articles comprising at least three components: hydrophobic aerogel particles, non-porous hollow particles, and an aqueous binder system. The non-porous hollow particles have a typically diameter of one micrometer or greater and one millimeter or less.

United States published patent application 2003/0003284 discloses an article comprising a layer containing aerogel material a binder matrix and a layer containing polyethylene terephthalate fibers in a binder matrix.

U.S. Pat. No. 5,656,195 discloses moldings that contain silica aerogel particles bonded to one another by means of at least one organic or inorganic binder that further contains sheet silicates and/or clay minerals.

It is desirable to continue to advance the art of thermal insulating articles that contain nanoporous materials to further develop an article offering optimal versatility and performance. For example, it is desirable to provide a thermally insulating article that comprises nanoporous particles within a matrix that itself is nanoporous so as to further increase the thermal insulating properties of the article. Even more desirable is such an article that can assume a variety of shapes and a process for making such articles in any of a variety of shapes without a need for milling or cutting the article. Yet more desirable is such an article that does not require foaming, which can be challenging to control when forming nano-sized cells.

BRIEF SUMMARY OF THE INVENTION

The present invention offers a solution to the problem of obtaining a thermally insulating article that comprises nanoporous particles within a matrix that itself is nanoporous so as to further increase the thermal insulating properties of the article. Even more, the present invention offers a process for preparing such an article in a variety of shapes without requiring milling or cutting. Yet more, the present invention offers such an article that does not require foaming, which can be challenging to control when forming nano-sized cells.

Surprisingly, the present invention uses hollow latex particles where each hollow latex particle has an interior void with an inside diameter that is less than one micrometer (that is, a nano-scale void) to bind to one another for forming a matrix that contains nanoporous particles. The hollow latex particles serve as both a binder and a source for nano-scale voids in the resulting article thereby obviating a need to include both a binder and hollow filler in combination with nanoporous particles. Dispersing nanoporous particles such as aerogel particles within a hollow latex matrix provides a surprisingly versatile and highly thermally insulating material. Moreover, the binder can mechanically bind the nanoporous particle within its matrix so covalent and/or ionic bonding is unnecessary between the binder and nanoporous particles. The article can assume virtually any shape, including complex three-dimensional shapes, by molding a dispersion of nanoporous particle in a latex comprising hollow latex particles and then drying the dispersion to form the final article.

In a first aspect, the present invention is an article of manufacture comprising nanoporous particles and hollow latex particles, wherein the hollow latex particles comprise a rigid inner shell and adhesive outer shell and wherein the hollow latex particles are bound directly to one another to form a continuous matrix and the nanoporous particles being dispersed within the continuous matrix of hollow latex particles.

In a second aspect, the present invention is a process for preparing an article of manufacture, the process comprising: (a) providing a latex of hollow latex particles; (h) providing nanoporous particles and dispersing them into the latex; (c) drying the latex so as to cause the hollow latex particles to bind to one another thereby forming the article of manufacture of the first aspect.

In a third aspect, the present invention is a method of using the article of the first aspect, the method comprising providing a structure defining two areas having an interface where they meet and positioning the article proximate to the interface of the two areas The process of the present invention is useful for preparing the article of the present invention. The article of the present invention is useful as thermal insulation. The method of using the article of the present invention is useful to implementing the article as thermal insulation.

DETAILED DESCRIPTION OF THE INVENTION

Test methods refer to the most recent test method as of the priority date of this document unless the test method number includes a different date. References to test methods contain both a reference to the testing society and the test method number. The following test method abbreviations apply herein: ASTM refers to American Society for Testing and Materials; EN refers to European Norm; DIN refers to Deutsches Institute für Normung; and ISO refers to International Organization for Standards.

"Multiple" means two or more. "And/or" means "and, or as an alternative". All ranges include endpoints unless otherwise indicated.

"Length", "width" and "thickness" are three mutually perpendicular dimensions of an article. Length is a dimension having a magnitude equivalent to the largest magnitude dimension of the length, width and thickness. Thickness has a magnitude equal to the smallest magnitude of the length, width and thickness. Width has a magnitude equal to the length, thickness, both the length and thickness, or a magnitude somewhere between that of the length and thickness.

"Functionally free" means that, if present, the concentration is below that which would have a material effect on the physical properties of the article of the present invention, unless otherwise specifically defined herein. For example, nanoporous particles that are functionally free of a coating means that there is no material effect on the physical properties of the article of the present invention containing the nanoporous particles due to the presence of the coating. Within the scope of the definition of "functionally free" is "free of" (meaning absent).

"Particle" refers to objects of any shape that have a largest dimension that is less than five millimeters (mm).

Nanoporous particles for use in the present invention are particles that have defined in them voids, or pores, that have a cross sectional dimension that is less than one micron, preferably 500 nanometers (nm) or less, still more preferably 250 nm or less, still more preferably 100 nm or less and yet more preferably 70 nm or less. Typically, the average pore cross sectional diameters of the nanoporous particles are 5 nm or more. Determine average pore cross sectional diameters of the nanoporous particles using calculations according to the Brunauer-Emmett-Teller (BET) technique with desorption curve data collected using the method of Barrett-Joyner-Henda (see, K. S. W. Sing et al., Pure & Appl. Chem., Vol. 57, No. 4, pp. 603-619 (1985)). Pore size and isotherm classification follow IUPAC standards.

The nanoporous particles can be organic, inorganic or a hybrid of organic and inorganic materials. Desirably, the nanoporous particles are inorganic nanoporous particles. The nanoporous particles can be free of organic components having latent covalent bonding reactivity (reactivity susceptible to covalent bond formation) and are desirably free of organic components altogether.

Suitable nanoporous particles include aerogel, xerogel, cryogel, zeolite, dried alcogel, pyrogenic silica, organic thermoplastic and/or crosslinked nanoporous particles and mesostructured cellular materials. Inorganic aerogel materials are perhaps the most well known nanoporous materials that are suitable for use in the present invention. Inorganic aerogel materials include those made of metallic oxides, such as silica, alumina, titania and ceria, as prepared from sol-gel techniques. Silicon (Si) or aluminum (Al) based aerogel composites are two such more commonly used materials. A common and particularly desirable aerogel material for use as the nanoporous particles of the present invention are silicon dioxide ($SiO_2$) aerogels.

Typically, nanoporous particles suitable for use in the present invention have a largest dimension that is four mm or less, preferably two mm or less. At the same time, it is typical that nanoporous particles for use in the present invention have a largest dimension that is five micrometer or more, preferably 50 micrometers or more and still more preferably 200 micrometers or more. It is within the scope of the present invention to use a broad particle size distribution of nanoporous particles and/or nanoporous particles having a multimodal or a bimodal particle size distribution, which can be desirable to facilitate a more dense packing of nanoporous particles within the final article than is achievable with a narrow particle size distribution of nanoporous particles.

The nanoporous particles can be functionally free, and can be absolutely free of functional coatings. Functional coatings form a coherent layer over or encapsulate a nanoporous particle and impart at least one chemical or physical property or characteristic to that surface that is different from the chemical and physical properties and characteristics of the pre-coated particle surface. For example, US2008/0287561 describes polymeric foams containing aerogel particles in a polymer matrix, but the aerogel particles comprise a functional coating that forms a cohesive barrier layer on the outer surface of the particles thereby preventing polymer from penetrating pores of the aerogel particles. Therefore, the aerogel particles of US2008/0287561 are not functionally free of functional coatings.

Desirably, pore walls of the nanoporous particles have a sufficiently hydrophobic surface so as to preclude water absorption throughout the porous structure of the particles. If the pore walls of the particles are too hydrophilic, water from the binder composition can soak into the pore structure of the particle making drying of the final article difficult and can lead to collapse of the particle during drying due to the capillary force of water exiting the pore network. This does not necessarily require any coating or treatment on the outside surface of the particle itself, as is required in US2008/0287561 but rather a characteristic of the pore wall within the particles. Determine if a nanoporous particle has such a sufficiently hydrophobic surface so as to preclude water absorption throughout the porous structure of the particles by subjecting a group of particles to a water bath for 30 minutes, drying the particles in a forced air oven at 80° C. for three hours and determining the amount of water remaining in the particles. If less than 15%, preferably less than 10%, more preferably less than 5%, still more preferably less than 2% of the weight of the dried particles corresponds to water then the pore walls of the particles have a sufficiently hydrophobic surface so as to preclude water absorption throughout the porous structure of the particles.

Latex particles are particles that are, or once were, suspended in an aqueous medium as a latex and that upon removing the aqueous medium become directly bound to one another to form a continuous interconnected network (or "matrix") of latex particles. Latex particles are "directly" bound to one another if they attach to one another without use of any binder or adhesive apart from what is a component of the latex particles themselves.

Latex particles for use in the present invention are "hollow" latex particles, meaning that they have an internal void defined by a shell around the void. The average diameter of the void is the "inside diameter" of the latex particle. The average inside diameter of the hollow latex particles is generally 1,000 nm or less, more typically 500 nm or less. At the same time, the average inside diameter of the hollow latex particles is generally 50 nm or more, more typically 200 nm or more. Desirably, each hollow latex particle has an inside diameter that is 1,000 nm or less, preferably 500 nm or less and desirably 20 nm or more, preferably 200 nm or more. Typically, the void volume of a hollow latex particle is 5 volume-percent (vol %) or more, preferably 10 vol % or more of the total hollow latex particle volume. At the same time, the void volume of a hollow latex particle is generally 30 vol % or less, more typically 25 vol % or less and even more typically 20 vol % or less of the total hollow latex particle volume.

The shell around the void in each hollow latex particle comprises at a minimum a rigid inner shell (first shell) and an adhesive outer shell (second shell). A shell is "rigid" if it prevents complete collapse of the hollow latex particle as the latex containing the hollow latex particles dries. A shell is "inner" if there is at least one shell outside of it, where "outside" corresponds to having a greater radial distance from the particle center. A shell is "adhesive" if it can bind with another surface containing a like adhesive when the particles are drawn together by capillary action as the latex comprising the particles dries. The outer adhesive shell is typically a film forming material that forms a film with the outer shell of adjoining hollow latex particle. As a result, the hollow latex particle can be bound together without covalent bonding, without ionic bonding, or without either covalent bonding or ionic bonding (that is, without any chemical bonding) between particles. A shell is "outer" if there are no shells outside of it.

Generally, each hollow latex particle has a core comprising a core material that serves as the inner-most shell and that defines the void space inside the hollow latex particle. The core material is present in combination with the rigid inner shell (first shell) and outer adhesive shell (second shell). The core material is commonly an acrylic polymer in the general shape of a hollow sphere. A tie-coat can also be present directly between the first shell and the second shell. European Patent application EP2143742A1 (incorporated herein by reference in its entirety) discloses hollow latex particles suitable for use in the present invention that contain a core, a rigid first shell, an adhesive second shell and optional tie-coat between the first and second shells. EP2143742A1 also discloses how to prepare such latex particles.

The core generally has an unswollen particle size of from 50 nanometers (nm) to 1.0 micron, preferably from 100 nm to 300 nm. Typically, the core material is 5 wt % or less, and more typically 3 wt % or less of the total weight of the hollow latex particle. At the same time, the core material is generally one wt % or more of the total weight of the hollow latex particle.

The inner shell (first shell) is desirably a polymer composition having a glass transition temperature (Tg) that is greater than 50 degrees Celsius (° C.), preferably greater than 75° C., still more preferably 90° C. or greater and can be 100° C. or greater. Moreover, it is desirable that the inner shell include, as polymerized units, from 15 weight-percent (wt %) to 60 wt %, preferably from 20 wt % to 50 wt %, and more preferably from 20 wt % to 40 wt %, based on weight of the total inner shell polymer composition, monomer selected from a group consisting of acrylonitrile, methacrylonitrile, acrylamide, methacrylamide, and mixtures thereof. The inner shell polymer compositions desirably further contains from 0.3 wt % to 10 wt %, preferably from 0.5 wt % to 10 wt % based on the inner shell polymer composition weight, multiethylenically unsaturated monomer such as (meth)acrylonitrile. Styrene is a preferred comonomer. One desirable inner shell polymer composition is a styrene-acrylonitrile copolymer containing acrylonitrile at a concentration in a range of 15 wt % to 25 wt %, preferably 18 wt % to 23 wt % and most preferably approximately 20 wt % based on total inner shell polymer composition weight. The inner (first) shell typically is 25 wt % or more, preferably 30 wt % or more of the total hollow latex particle weight. The inner (first) shell is at the same time typically 40 wt % or less, preferably 35 wt % or less of the total hollow latex particle weight.

The outer shell (second shell) desirably is made of a polymer having a Tg in a range from −60° C. to 50° C., preferably from −40° C. to 30° C., and more preferably from −20° C. to 20° C. Suitable monomers for preparing the outer shell polymer include monoethylenically unsaturated monomers in combination with 0.05 wt % to 10 wt % based on total outer shell polymer weight of multiethylenically unsaturated monomers. Selection of the polymer composition of the outer shell is restricted to those polymer compositions that will adhere to one another under conditions suitable for forming a continuous matrix of hollow latex particles. Suitable outer shell (second shell) polymers typically include acrylic and methacrylic polymers and copolymers. One example of a suitable outer shell polymer composition is a butyl acrylate/methyl methacrylate copolymer.

The hollow latex particles can comprise a tie-layer between the inner (first) and outer (second) shells. Generally, the tie-layer comprises polymeric material similar to the outer (second) shell and can further comprise acrylic and/or methacrylic acid monomers copolymerized with acrylate and methacrylate monomers. The combination of outer (second) shell and tie-layer weight is typically 50 wt % or more and more typically 60 wt % or more, yet more typically 65 wt % or more of the total hollow latex particle weight. At the same time the combination of outer (second) shell and tie-layer weight is typically 90 wt % or less and more typically 80 wt % or less of the total hollow latex particle weight.

Calculate glass transition temperatures for the inner and outer shell polymer compositions using the Fox equation as described in EP2143742A1 paragraphs 17 and 18.

The composition of hollow latex particles can be the same or different within the scope of the present invention. For example, a single latex of hollow latex particles can be used to prepare the articles or a blend of two or more different latexes each of which can contain hollow latex particles having different compositions can be used to prepare the article of the present invention. Desirably, if the article contains hollow latex particles having different compositions the adhesive outer shell of the different particles are capable of binding to one another.

Hollow latex particles for use in the present invention typically have an average particle size, while dispersed in an aqueous medium, that is typically 100 nm or larger, preferably 250 nm or larger and generally are 500 nm or larger. At the same time, the hollow latex particles typically have an average particle size while dispersed in an aqueous medium, that is typically 4.5 microns or less, preferably 3.5 microns or less and still more preferably 2.0 microns or less. These sizes are for particles dispersed in an unswollen state at a pH below 6.

Hollow latex particles offer performance advantages over hollow glass microspheres. Hollow latex particle for use in the present invention bind to one another without requiring a separate binder as is required with hollow glass microspheres. Additionally, hollow latex particles are lower in density than hollow glass microspheres at least partially because the shells around the void in the hollow latex particles are primarily, preferably entirely, organic polymer as opposed to inorganic material as in the glass microspheres. Lower density hollow latex particles enable formation of articles having a lower density than articles containing hollow glass microspheres at an equivalent concentration as hollow latex particles. Moreover, use of hollow latex particles that provide both the binder and hollow filler in one can achieve a more homogeneously distribution of nanoscale voids in the final article then dispersing a hollow filler within a separate binder.

Articles of the present invention comprise hollow latex particles bound directly to one another to form a continuous matrix and nanoporous particles dispersed within the continuous matrix of hollow latex particles. The latex particles are bound directly to one another by adhering outer shells of the particles to one another, for example, by forming a film between the outer shell polymer compositions of the particles. There can be an absence of covalent bonding between bound latex particles. There can also be an absence of covalent bonding between latex particles and nanoporous particles. Typically, nanoporous particles are mechanically trapped within the continuous hollow latex particle matrix and are free of covalent bonding, ionic bonding, or both covalent and ionic bonding (that is, free of chemical bonding) to the latex particles.

Articles of the present invention typically comprise nanoporous particles at a concentration of 55 volume-percent (vol %) or more, preferably 70 vol % or more, more preferably 90 vol % or more. At the same time, the articles typically comprise nanoporous particles at a concentration of 99 vol % or less, preferably 98 vol % or less. Vol % is relative to total article volume.

Articles of the present invention typically comprise hollow latex particles at a concentration of one vol % or more, preferably 5 vol % or more. At the same time, the articles typically comprise hollow latex particles at a concentration of 50 vol % or less, preferably 35 vol % or less and still more preferably 25 vol % or less. Vol % is relative to total article volume.

In addition to nanoporous particles, article of the present invention can further include additional additives dispersed within the hollow latex particle matrix. Suitable additional additives include any one or combination of more than one materials selected from a group consisting of fibers (organic or inorganic), flame retardants, pigments, infrared attenuators, reflective particles and ultraviolet stabilizers. Generally, the concentration of additional additives is five wt % or less based on total article weight. At the same time, the present invention can be free of any one or more than one of these same additional additives. Moreover, the present invention can be and desirably is free of hollow glass microspheres.

The combination of nanoporous particles dispersed within a matrix that itself have a multitude of nano-scale voids causes the article of the present invention to have a desirably low thermal conductivity. Article of the present invention desirably have a thermal conductivity of 25 milliWatts per meter*Kelvin (mW/m*K) or less, preferably 23 mW/m*K or less, still more preferably 22 mW/m*K or less, and yet more preferably 21.5 mW/m*K or less. Measure thermal conductivity according to ASTM C518.

Another desirable feature of articles of the present invention is that they are low density articles making them easy to handle, install and able to provide insulating value without adding extensive weight to structures in which they reside. Articles of the present invention typically have a density of 0.13 grams per cubic centimeter (g/cm$^3$) or less. Determine article density according to ASTM D1622.

Articles of the present invention can have any conceivable shape. One common shape is that of a board have a length, width and thickness. However, articles of the present invention can further be of a custom shape suitable for fitting in and/or around features of an appliance or building. The article can be a hollow tube suitable for applying around tubing or pipe to insulate the tubing or pipe. Any conceivable shape article is within the scope of the article of the present invention. However, the articles of the present invention are distinct from films in that they have a smallest dimension that extends through the centroid of the article that is greater than five millimeters, preferably ten mm or more and can be 25 mm or more.

Articles of the present invention are surprisingly flexible. The articles are capable of bending without fracturing or crumbling thereby offering durability advantages over typical aerogel structures. Particularly desirable articles of the present invention are capable of bending at least 30 degrees, preferably at least 60 degrees around a mandrel parallel to article's surface when the mandrel has a diameter equal to the thickness of the article.

Particular embodiments of the present invention further have interstitial nanovoids between nanoporous particles and bound hollow latex particles. Interstitial nanovoids tend to form as the aqueous medium of the latex containing the hollow latex particles evaporates if the hollow latex particles are unable to deform to fill all of the space previously occupied by the aqueous medium. Generally, the outer (second) layer of the hollow latex particles forms a film with out (second) layers of adjoining hollow latex particles that fills much of the space previously occupied by aqueous medium. However, it is common for some void space to remain in the form of voids on the order of nanometers in size between the nanoporous particles and hollow latex particles. Those voids are interstitial nanovoids. The presence of such interstitial nanovoids can be desirable by contributing to a lower density article and even an article having a lower thermal conductivity than an article without the interstitial nanovoids.

Articles of the present invention can further comprise a facer material (or simply "facer") on one or more surface of the article. Suitable facers include woven and non-woven fibrous sheet materials as well as solid metal, wood, and/or polymeric sheets or combinations there of. Examples of suitable fibrous sheet materials include paper sheet, scrims and glass mats.

Prepare articles of the present invention by providing a latex of hollow latex particles, providing nanoporous particle and dispersing them into the latex and then drying the latex so as to cause the hollow latex particles to bind to one another thereby forming an article of the present invention. To foam an article of a particular shape, cast the latex containing nanoporous particles dispersed therein into a mold of the particular shape prior to drying so that the resulting article assumes a shape similar to the mold. The mold can be a simple sheet of a particular thickness that holds the latex into a board shape as it dries thereby producing an article in the shape of a board. The mold can also be a complex shape. For example the mold can be sufficient to mold the latex into an article that is a hollow tube suitable for insulating pipes. The mold can be suitable to form articles of the present invention into custom shapes to fit in and/or around features of a particular appliance or building.

The hollow latex particles are as described above for the article of the present invention. As in the article of the present invention, the process of the present invention can be free of covalent bonding between the nanoporous particles and hollow latex particles at any point in the process.

The process can include dispersing an additional additive (as described with the article of the present invention) into the latex prior to drying the latex. The concentration of hollow latex particles, nanoporous particles and, optionally, additional additives are as described above for the article of the present invention.

The process can further include a crosslinking step, preferably after drying the latex, so as to cause crosslinking between hollow latex particles.

The article of the present invention is particularly useful as a thermal insulating material. One method of using the article of the present invention is to provide a structure having that defines two areas having an interface where they meet and positioning the article of the present invention proximate to the interface of the two areas. Once in place, the article of the present invention can serve as thermal insulation between the two areas. For example, wall of a building structure define an interface between an inside area and an outside area of the building. Positioning the article of the present invention in the wall of the structure serves to help thermally insulate the inside area from the outside area and vice versa. Similarly, an appliance such as a refrigerator has an inside cavity and an outside area with a wall at the interface. Positioning the article of the present invention proximate to the wall of such an appliance thermally insulates the inside cavity from the outside area and vice versa.

The following example serves to further illustrate an embodiment of the present invention.

EXAMPLE 1

Prepare a latex of hollow latex particles according to Example 13 of EP2143742. The latex has a solids content of approximately 47 wt %. To 50 milliliters of the latex slowly add 33.75 grams of NANOGEL™ brand silica aerogel particles (NANOGEL is a trademark of Cabot Corporation) while mixing. The aerogel particles have an average particle size of 0.7 to 1.2 millimeters, an average pore size of 20-40 nanometers and are functionally free of organic components having latent covalent bonding reactivity and functional coatings. The aerogel particles further have a maximum of 1.4 wt % water after subjecting a group of the particles to a water bath for 30 minutes and then drying the particle in a force air oven at 80° C. for three hours.

Continue to mix the latex/aerogel composition for 20 minutes and then pour the composition into a mold 15 centimeters long, 15 centimeters wide and 1.5 centimeters thick. Place the fold containing the composition into an oven at 60° C. to dry for approximately three hours to form Example 1, an article of the present invention.

Example 1 has dimensions of 15 centimeter long, 15 centimeter wide and 1.5 centimeters thick. The hollow latex particles of Example 1 have an inside diameter that is approximately 310 nm. Example 1 is free from covalent bonding between the aerogel particles and the hollow latex particles and is flexible. Example 1 has defined therein interstitial nanovoids, has a density of 0.12 grams per cubic meter according to ASTM D1622 and has a thermal conductivity according to ASTM C518 of 21.2 mW/m*K. The aerogel particles are present in Example 1 at a concentration of approximately 95.2 vol % of the final dried article while the hollow latex particles account for 4.8 vol % of the final dried article. Example 1 is flexible and capable of bending without fracturing or crumbling. Example 1 can bend at least 30 degrees around a mandrel parallel to the article's surface with the mandrel has a diameter equal to the thickness of the article.

The invention claimed is:

1. An article of manufacture comprising nanoporous particles and hollow latex particles, wherein the hollow latex particles comprise a rigid inner shell and adhesive outer shell and wherein the hollow latex particles are bound directly to one another to form a continuous matrix and the nanoporous particles being functionally free of a functional coating and dispersed within the continuous matrix of hollow latex particles, wherein the article has a smallest dimension that is greater than 5 millimeters.

2. The article of claim 1, further characterized by the hollow latex particles having an inside diameter that is less than 500 nanometers.

3. The article of claim 1, further characterized by an absence of covalent bonding between the hollow latex particles and the nanoporous particles.

4. The article of claim 1, further characterized by the hollow latex particles having a styrenic inner shell and an acrylic outer shell.

5. The article of claim 1, further characterized by the nanoporous particles being present at a concentration in a range of 50 to 99 volume-percent based on total article volume.

6. The article of claim 1, wherein the nanoporous particles include aerogel particles that contain silicon dioxide.

7. The article of claim 1, wherein the nanoporous particle have pore walls that are sufficiently hydrophobic so as to preclude water absorption throughout the porous structure of the particles.

8. The article of claim 1, further characterized by having a thermal conductivity that is less than 25 milliWatts per meter*Kelvin.

9. The article of claim 1, having defined therein a multitude of interstitial nanovoids.

10. The article of claim 1, further comprising a facer on at least one surface of the article.

11. A process for preparing an article of manufacture, the process comprising:
 a. Providing a latex of hollow latex particles that comprise a rigid inner shell and adhesive outer shell;
 b. Providing nanoporous particles that are functionally free of a functional coating and dispersing them into the latex;
 c. Drying the latex so as to cause the hollow latex particles to bind to one another thereby forming the article of manufacture of claim 1.

12. The process of claim 11, further characterized by the hollow latex particles having an inside diameter that is less than 500 nanometers.

13. The process of claim 11, further characterized by an absence of covalent bonding between the hollow latex particles and the nanoporous particles at any point in the process.

14. The process of claim 11, further characterized by the hollow latex particles having a styrenic inner shell and an acrylic outer shell.

15. The process of claim 11, further characterized by the nanoporous particles being present at a concentration in a range of 50 to 99 volume-percent of the total article of manufacture volume.

16. The process of claim 11, wherein the nanoporous particles have pore walls that are sufficiently hydrophobic so as to preclude water absorption throughout the porous structure of the particles.

17. The process of claim 11, further comprising a crosslinking step that causes crosslinking between hollow latex particles after step (b).

18. A method of using the article of claim 1, the method comprising providing a structure defining two areas having an interface where they meet and positioning the article proximate to the interface of the two areas.

* * * * *